Patented Dec. 31, 1946

2,413,469

UNITED STATES PATENT OFFICE 2,413,469

PREPARATION OF NITROGEN COMPOUNDS

Carl E. Schweitzer, Wilmington, Del., assignor to E. I. du Pont de Nemours & Company, Wilmington, Del., a corporation of Delaware No Drawing. Application May 1, 1944, Serial No. 533,653

11 Claims. (Cl. 23—78)

This invention relates to the preparation of nitrogen compounds, and particularly to improvements in processes for the synthesis of cyanamide and related products from ammonia and carbon dioxide.

It has long been known that metallic cyanamides may be prepared by treating the carbonates of divalent metals with ammonia-carbon dioxide mixtures at temperatures near the dissociation temperature of the carbonates. It has also been known that the reaction between the ammonia and carbonates of divalent metals may be conducted preferably in an apparatus constructed of refractory materials, particularly glass or quartz, and that certain metallic materials of construction cannot be employed satisfactorily in such apparatus, since they catalyze the decomposition of ammonia at the temperature required for the reaction. The refractory materials which have been employed heretofore in the manufacture of calcium cyanamide from ammonia and calcium carbonate have not been entirely satisfactory. For example it was objectionable to employ quartz as a material of construction because of its difficult workability. Glass was an unsatisfactory material to use since the optimum reaction temperature was close to the melting point of glass.

The reactions by which metallic cyanamides and derivatives thereof, particularly dicyandiamide, have been prepared from ammonia and carbon dioxide may be represented as follows:

(1)    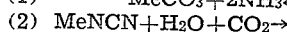$\rightleftharpoons$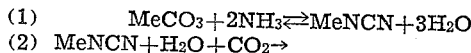
(2)   MeNCN+H$_2$O+CO$_2$→
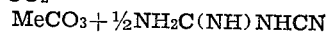

The ammoniation step (step #1) generally has been conducted at a temperature in the range of about 400° to 1000° C., while the carbonation step (step #2) has been conducted simply by introducing carbon dioxide into an aqueous solution of the metallic cyanamide at room temperature.

The improvements with which this invention is concerned involve the ammoniation step represented by Equation 1. An object of this invention is to provide a method for obtaining improved yields of metallic cyanamides by high temperature ammoniation of divalent metal carbonates. Another object of the invention is to provide a method for high temperature ammoniation of divalent metal carbonates to form metallic cyanamides in high yield without the use of quartz or glass as materials of construction.

These and other objects are accomplished in accordance with this invention by treating divalent metal carbonates with ammonia in an apparatus made of, or lined with, a refractory containing zirconium silicate. A suitable zirconium silicate refractory for the purpose of the present invention is the material known as Zircofrax, manufactured by The Carborundum Company, Niagara Falls, N. Y. The zirconium silicate refractories are poor ammonia decomposition catalysts, hence they are useful in connection with the ammoniation reaction represented by Equation 1. Moreover, equipment constructed from this refractory is gas-tight, resistant to thermal shock, and capable of withstanding very high temperatures.

The reaction between divalent metal carbonates and ammonia, in accordance with this invention, is preferably conducted in the presence of an oxide of carbon, particularly carbon monoxide or carbon dioxide. An advantage in the use of carbon monoxide is that it serves as an acceptor for at least part of the water formed by the ammoniation, hence is helpful in driving the reaction towards completion. This occurs in accordance with the following equation

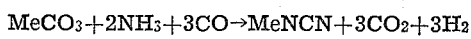

The ammoniation of the divalent metal carbonates is preferably conducted according to this invention by treating a divalent metal carbonate with ammonia at a temperature in the range of about 400° to 1000° C., preferably 700° to 800° C. Furthermore it is preferred to use an excess of ammonia over the amount theoretically required, a suitable quantity being about 2.0 to 50 mols per mol of the carbonate reacting. Any suitable pressure may be employed, but the reaction takes place satisfactorily at about atmospheric pressure. It is advantageous, although not absolutely necessary, to have present in the reaction mixture an oxide of carbon in the proportion of about 0.1 to 0.5 mols per mol of ammonia. The conversion of divalent metal carbonate to metallic cyanamide requires a reaction time of from about 0.5 to about 8.0 hours, although conversions of from 50% to 70% are usually obtained at a reaction time of about 1.0 to 1.5 hours.

The invention is further illustrated by the following examples.

*Example 1.*—A Zircofrax tube containing 10 grams of calcium carbonate was heated at a temperature of 720° to 750° C. for 1.5 hours, during which time a mixture containing 77.5 grams of ammonia and 101.0 grams of carbon dioxide was passed through the tube. The loss of ammonia to nitrogen and hydrogen amounted to 2.2% of the ammonia charged. The conversion of calcium carbonate to calcium cyanamide was 69.3%.

*Example 2.*—A Zircofrax tube containing 10 grams of calcium carbonate was heated at a temperature of 740° to 750° C., while a mixture containing 15.5 grams of ammonia and 9.2 grams of carbon monoxide was passed through the tube in the course of 1.5 hours. Loss of ammonia by decomposition to nitrogen and hydrogen amounted to 4% of the total ammonia charged. The conversion of calcium carbonate to calcium cyanamide was 52%.

*Example 3.*—In a Zircofrax tube 19.7 grams of barium carbonate was heated at a temperature of 760° to 790° C. while being processed with 56 grams of ammonia over a period of 1.08 hours. The conversion of barium carbonate to barium cyanamide was 52.6%.

The metallic cyanamides prepared in accordance with the general method illustrated by the foregoing examples may be used for a variety of purposes. For example, the crude solid ammoniation product containing calcium cyanamide may be extracted with water, yielding an aqueous extract from which the calcium can be precipitated as calcium carbonate by treatment with carbon dioxide, suitably at ordinary temperatures. The calcium carbonate thus precipitated may be separated from the extract by centrifuging or filtration. The resultant aqueous solution may be evaporated at a temperature above room temperature whereby dicyandiamide is obtained in almost quantitative yield.

Alternatively the evaporation may be conducted at a temperature below room temperature, in which case the product is chiefly cyanamide. Either the cyanamide or the dicyanamide, or mixtures of these two compounds, may be converted to melamine, suitably by heating in a closed vessel with ammonia at a temperature above about 100° C.

It will occur to those skilled in the art that various procedural modifications may be made in the practice of this invention. For example, the invention may be conducted either batchwise or continuously. Suitable devices may be employed for recovery and re-use of the unreacted ammonia and carbon dioxide. The calcium carbonate produced in the carbonation step may be recycled to the ammoniation step, if desired. The nitrogen and hydrogen produced as by-products may profitably be returned to an ammonia synthesis unit in certain cases.

Widely different embodiments of this invention may be made without sacrificing its advantages or departing from the spirit and scope thereof.

I claim:

1. In a process for the preparation of nitrogen compounds, the step which comprises subjecting a divalent metal carbonate to the action of ammonia in an apparatus constructed of a zirconium silicate refractory.

2. In a process for the preparation of nitrogen compounds, the step which comprises subjecting a divalent metal carbonate to the action of ammonia at a temperature in the range of 400° to 1000° C. in an apparatus constructed of a zirconium silicate refractory.

3. In a process for the preparation of nitrogen compounds, the step which comprises subjecting a divalent metal carbonate to the action of ammonia and an oxide of carbon at a temperature in the range of 400° to 1000° C., in an apparatus constructed of a zirconium silicate refractory.

4. In a process for the preparation of nitrogen compounds, the step which comprises subjecting a divalent metal carbonate to the action of ammonia and carbon dioxide at a temperature in the range of 400° to 1000° C., in an apparatus constructed of a zirconium silicate refractory.

5. In a process for the preparation of nitrogen compounds, the step which comprises subjecting a divalent metal carbonate to the action of ammonia and carbon monoxide at a temperature in the range of 400° to 1000° C., in an apparatus constructed of a zirconium silicate refractory.

6. In a process for the preparation of calcium cyanamide the step which comprises subjecting calcium carbonate to the action of ammonia and an oxide of carbon at a temperature in the range of 400° to 1000° C., in an apparatus constructed of a zirconium silicate refractory.

7. In a process for the preparation of barium cyanamide the steps which comprise subjecting barium carbonate to the action of ammonia and an oxide of carbon at a temperature in the range of 400° to 1000° C., in an apparatus constructed of a zirconium silicate refractory.

8. In a process for the preparation of divalent metal cyanamides, the step which comprises subjecting a divalent metal carbonate to the action of ammonia and an oxide of carbon at a temperature in the range of 700° to 800° C., in an apparatus constructed of a zirconium silicate refractory.

9. In a process for the preparation of divalent metal cyanamides, the steps which comprise subjecting a divalent metal carbonate to the action of ammonia and carbon monoxide at a temperature in the range of 700° to 800° C., in an apparatus constructed of a zirconium silicate refractory, and extracting the resultant solid product with water, whereby an aqueous extract containing divalent metal cyanamide is formed.

10. The process set forth in claim 8, wherein the said divalent metal carbonate is calcium carbonate.

11. The process set forth in claim 8, wherein the said divalent metal carbonate is barium carbonate.

CARL E. SCHWEITZER.